United States Patent
Geller et al.

(10) Patent No.: US 8,046,266 B1
(45) Date of Patent: Oct. 25, 2011

(54) CUSTOMIZING GIFT INSTRUMENT EXPERIENCES FOR RECIPIENTS

(75) Inventors: Michal Jonathan Geller, Seattle, WA (US); Terrance Douglas Hanold, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 190 days.

(21) Appl. No.: 12/058,421

(22) Filed: Mar. 28, 2008

(51) Int. Cl.
*G06Q 30/00* (2006.01)

(52) U.S. Cl. .............. 705/26.1; 705/14.1; 705/14.24; 705/26.41; 705/26.5; 705/26.7; 705/35

(58) Field of Classification Search ............ 705/35
See application file for complete search history.

(56) References Cited

U.S. PATENT DOCUMENTS

| | | | |
|---|---|---|---|
| 6,370,514 B1* | 4/2002 | Messner | 705/14.26 |
| 2002/0026377 A1* | 2/2002 | Takahashi | 705/26 |
| 2004/0140361 A1* | 7/2004 | Paul et al. | 235/462.45 |
| 2005/0119969 A1* | 6/2005 | Michelsen et al. | 705/39 |
| 2007/0058674 A1* | 3/2007 | Bucher et al. | 370/468 |
| 2008/0048023 A1* | 2/2008 | Russell et al. | 235/380 |
| 2008/0126211 A1* | 5/2008 | Kaufhold | 705/16 |
| 2009/0083139 A1* | 3/2009 | Pavlov | 705/14 |
| 2009/0234771 A1* | 9/2009 | Ledbetter et al. | 705/41 |

FOREIGN PATENT DOCUMENTS

WO WO0180159 * 10/2001

* cited by examiner

*Primary Examiner* — Elizabeth Rosen
(74) *Attorney, Agent, or Firm* — Armstrong Teasdale LLP

(57) ABSTRACT

Personalizing a gift instrument by customizing the presentation and redemption for a gift instrument recipient. A gift instrument purchaser or other data source associates customization information such as redemption recommendations, restrictions, or other content with the gift instrument based on the gift instrument recipient. The customization information is presented to the gift instrument recipient upon redemption of the gift instrument. In an embodiment, information about the redemption by the gift instrument recipient is provided to the gift instrument purchaser.

11 Claims, 8 Drawing Sheets

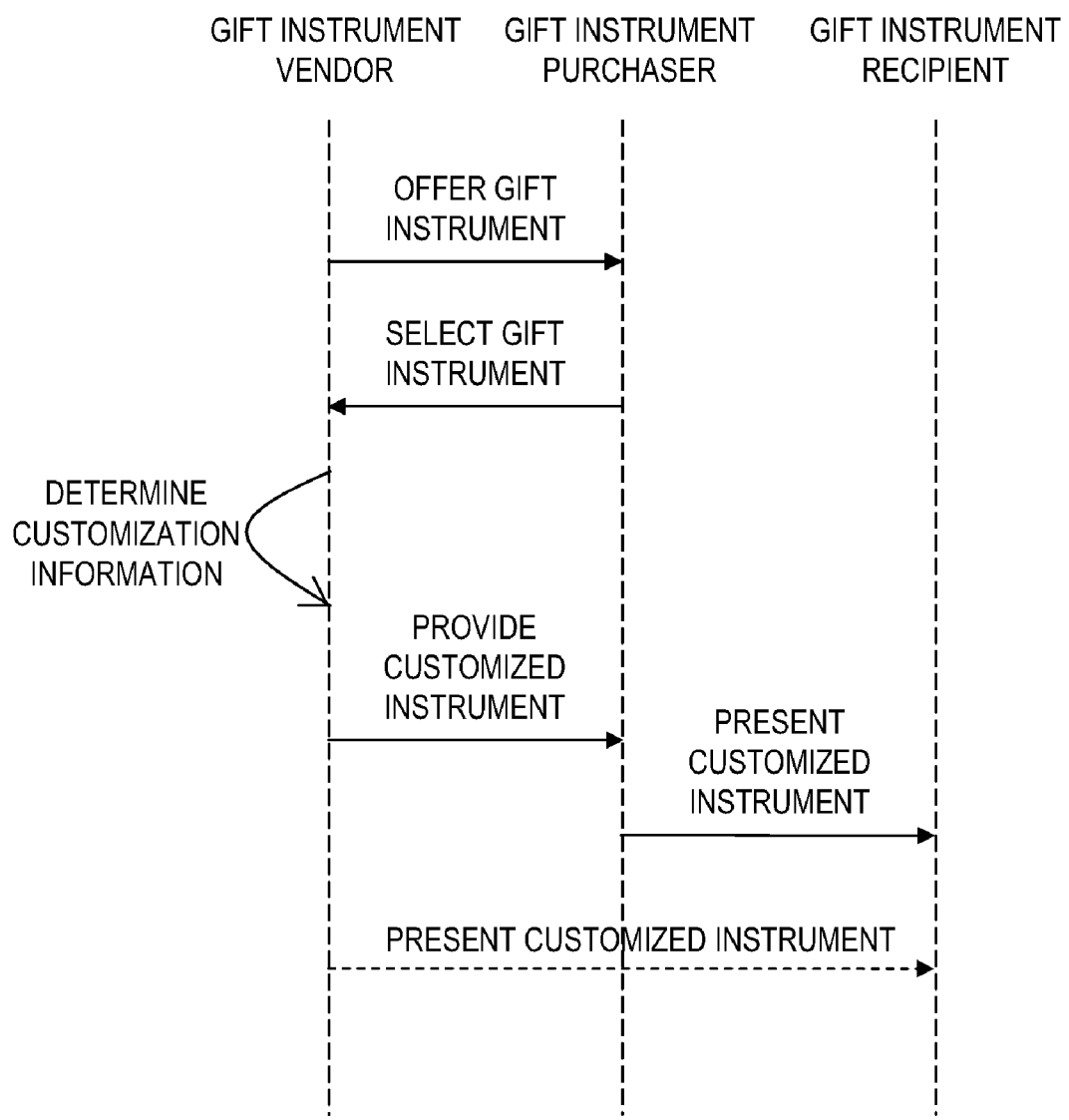

FIG. 6

Gift Instrument Customization http://www.website.com/order customization

Customize your gift!

| Item | Value |
|---|---|
| Gift Instrument | $50.00 |

Message

Happy Birthday Renee!
Treat yourself to something special. You might like one of the following products.

- Jack [click here to select category]

☐ Include recommended products
 ○ Select products individually [click here to select products]
 ○ Auto-select products from recipient's product request list
 ○ Auto-select products from my recommended products list
 ○ Auto-select products from list of top selling products [click here to select category]

Select presentation options
 ○ Provide the recommendations at delivery of gift instrument
 ○ Provide the recommendations during redemption of gift instrument
 ○ Provide the recommendations during both delivery and during redemption ☐ Present customized web page at redemption [click here to customize web page]
☐ Notify me when recipient redeems gift instrument [click here to select information to receive]
☐ Restrict redemption [click here to add product/category restrictions]

[CONTINUE WITH ORDER]

CUSTOMIZING GIFT INSTRUMENT EXPERIENCES FOR RECIPIENTS

BACKGROUND

Gift cards, stored-value cards, and other instruments are widely available for purchase and use at both online and offline merchants. Typical gift cards have a monetary value selected by the purchaser of the gift card. The purchaser presents the gift card to a recipient as a gift, incentive, or symbol of gratitude. However, some recipients view gift cards as impersonal as the gift cards typically require less effort by the purchaser compared to other gifts.

Some existing systems enable the purchaser of a gift card to include a short written message to the recipient on the face of the gift card or on the packaging of the gift card. Other systems enable the purchaser to select a particular pre-defined design of the gift card or to select the packaging. For example, the purchaser may select a birthday-themed gift card or a gift card emblazoned with "thank you." Such existing methods for personalizing the gift card, however, are limited and only occur at presentation of the gift card. Further, the existing methods do not enable the purchaser to control or receive information regarding redemption of the gift card by the recipient.

BRIEF DESCRIPTION OF THE DRAWINGS

FIG. 5 is an example sequence diagram illustrating the presentation of a customized gift instrument.

FIG. 6 is an example portion of a graphical user interface illustrating customization of a gift instrument.

Corresponding reference characters indicate corresponding parts throughout the drawings.

DETAILED DESCRIPTION

Figure 1:
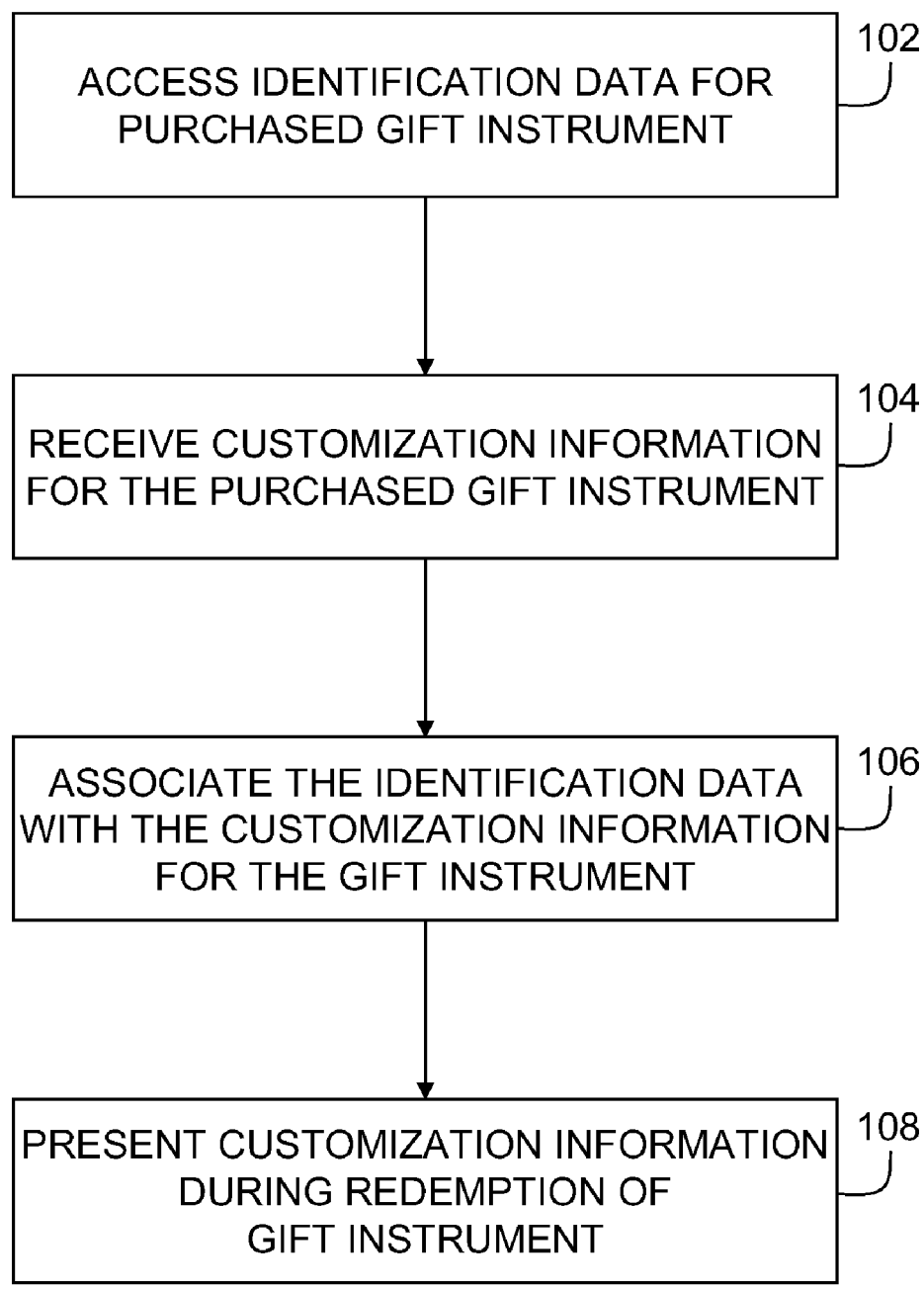
FIG. 1 is an example flow chart illustrating customization of a gift instrument.
Figure 2:
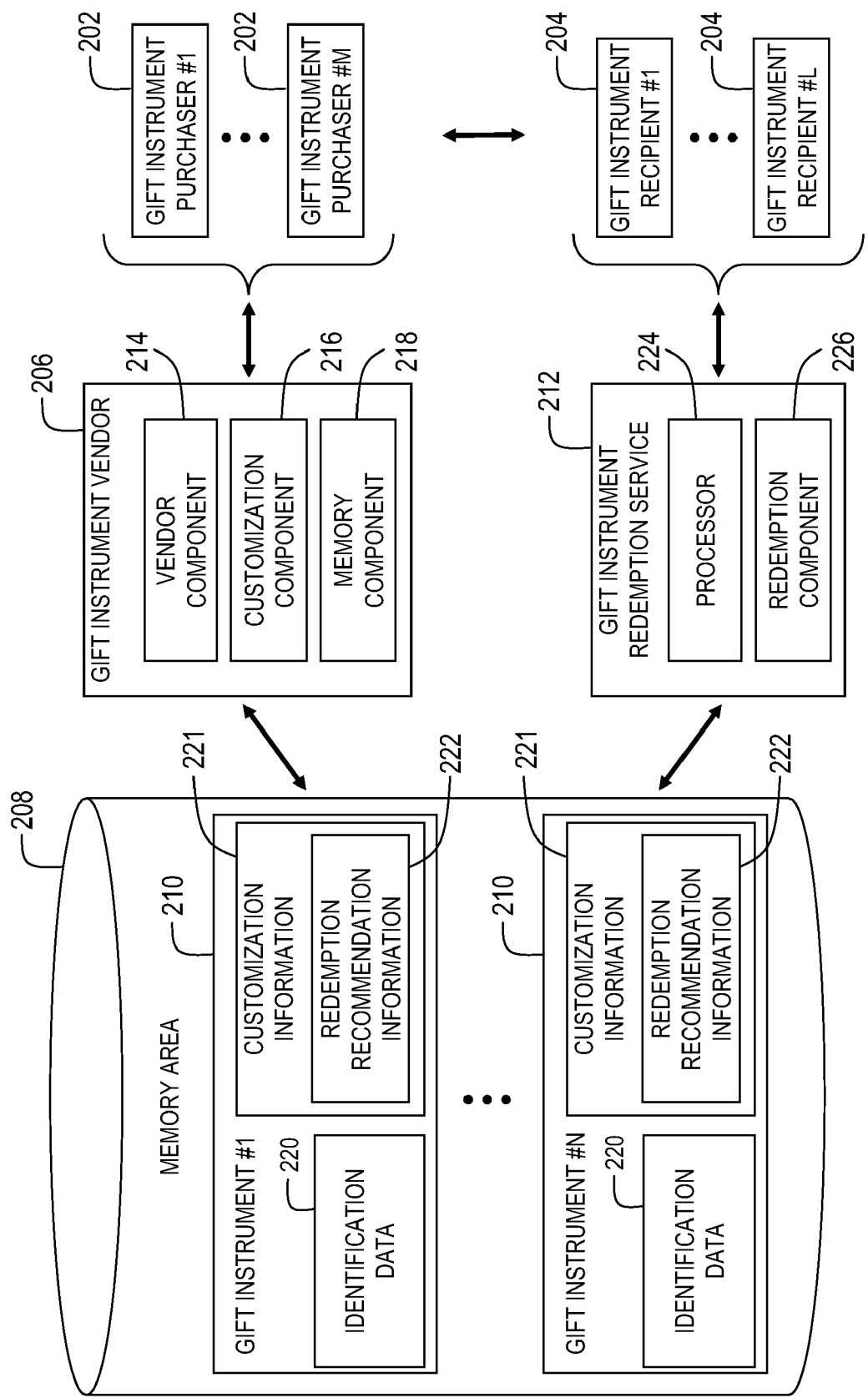
FIG. 2 is an example block diagram illustrating interaction between a gift instrument purchaser, a gift instrument vendor, and a memory area for customizing the gift instrument.

Disclosed embodiments enable the customization of a gift instrument 210 such as illustrated in FIG. 1 and FIG. 2. The gift instrument 210 includes any form of gift card, gift certificate, gift code or the like. For example, the gift instrument could be embodied in a physical medium such as a gift card, a letter bearing a gift code, among many other possibilities. Alternatively or in addition, the gift instrument can be embodied in an electronic medium such as an electronic gift card which could be, among other possibilities, an e-mail, short message service (SMS) message, web page display, or other electronic communication of a unique gift code, token or other mechanism that can be redeemed by the recipient for valuable compensation (e.g., towards the purchase or other consumption of an item). Knowledge of a gift instrument purchaser 202 is combined with knowledge of a gift instrument recipient 204 to customize or otherwise personalize the gift instrument 210 at redemption and provide a more robust and personal redemption experience. Aspects of various embodiments include any form of customizing the gift instrument 210 experience for the gift instrument recipient 204 with content such as messaging, product recommendations, etc. For example, personal notes such as "Thank you for filling out the survey" or "Happy Birthday from Mom" are presented to the gift instrument recipient 204 at redemption. In another example, a web site for redeeming the gift instrument 210 may be personalized for the gift instrument recipient 204. Further embodiments enable the gift instrument purchaser 202 to receive transaction information or other information describing redemption.

Referring again to FIG. 1, an example flow chart illustrates customization of the gift instrument 210. At 102, identification data 220 corresponding to the purchased gift instrument 210 is accessed. For example, the identification data 220 includes a serial number, bar code, or other identifying means for the gift instrument 210. The identification data 220 is stored or activated upon purchase of the gift instrument 210 by the gift instrument purchaser 202. For example, the gift instrument 210 is selected from a plurality of gift instruments 210 offered for sale. Each of the plurality of gift instruments 210 has the identification data 220 uniquely identifying each of the gift instruments 210. The gift instrument 210 may be purchased from a merchant online via a network such as the Internet or at a physical, bricks-and-mortar store.

At 104, customization information 221 relating to redemption of the gift instrument 210 is received. The customization information 221 is received from, for example, the gift instrument purchaser 202 or from another source such as a customization service. The customization service includes any data source including, for example, an online gift instrument customization service 404 or a product recommendation service. The customization information 221 includes any data that personalizes or otherwise customizes the gift instrument 210. For example, the customization information 221 includes redemption recommendation information 222 such as product or service recommendations. In embodiments, the redemption recommendation information 222 includes a list of products or services selected by the gift instrument purchaser 202 or by the product recommendation service. In other embodiments, the redemption recommendation information 222 includes query terms defined by the gift instrument purchaser 202. The query terms describe one or more categories, types, features, or characteristics of products or services. At redemption, a list of items is dynamically generated based on the query terms. For example, a gift instrument redemption service 212 performs a search on a product catalog using the query terms to generate the list of items. The list of items is provided to the gift instrument recipient 204.

At 106, the accessed identification data 220 is associated with the received customization information 221 by creating a correspondence between the accessed identification data 220 and the received customization information 221. For example, the customization information 221 is stored with or linked to the identification data 220 in a memory area 208 such as a database.

At 108, the customization information 221 is presented to the gift instrument recipient 204 upon redemption of the gift instrument 210. The gift instrument recipient 204 sends a request to redeem the gift instrument 210 to, for example, the gift instrument redemption service 212. The request includes the identification data 220. The customization information 221 is presented to the gift instrument recipient 204 responsive to the request. For example, the customization information 221 is presented to the gift instrument recipient 204 while the gift instrument recipient 204 is browsing a product catalog of an online merchant during redemption.

Referring next to FIG. 2, an example block diagram illustrates interactions between the gift instrument purchaser 202, a gift instrument vendor 206, and the memory area 208 storing information for customizing the gift instrument 210. While the gift instrument vendor 206 and the gift instrument redemption service 212 are illustrated and described in FIG. 2 as separate entities, a single entity performing the functions of both the gift instrument vendor 206 and the gift instrument redemption service 212 is within the scope of embodiments of the invention. Further, while the gift instrument vendor 206 is illustrated and described in FIG. 2 as performing both the sale and customization of the gift instrument 210, separate entities for performing the functions are within the scope of embodiments of the invention. For example, the entity that sells the gift instrument 210 is separate from the entity that enables the customization.

One or more of the gift instrument purchasers 202 such as gift instrument purchaser #1 through gift instrument purchaser #M interact with the gift instrument vendor 206, where M is a positive integer value. The gift instruments 210 are for one or more of the gift instrument recipients 204 such as gift instrument recipient #1 through gift instrument recipient #L, where L is a positive integer value. The gift instrument vendor 206 includes any merchant, store, or the like offering gift instruments 210 for sale. For example, the gift instrument vendor 206 includes an online merchant and/or a physical, bricks-and-mortar store. The gift instrument vendor 206 has access to one or more computer-readable media having computer-executable components for implementing the functionality of the gift instrument vendor 206. In an embodiment, the components include a vendor component 214, a customization component 216, and a memory component 218. The vendor component 214 offers a plurality of the gift instruments 210 for purchase by the gift instrument purchaser 202 for one or more of the gift instrument recipients 204. The vendor component 214 further receives, from the gift instrument purchaser 202, a selection of at least one of the offered plurality of gift instruments 210.

The customization component 216 provides suggested customization information including suggested redemption recommendation information for the selected gift instrument 210. The suggested redemption recommendation information includes, for example, a list of products or services suggested by the gift instrument vendor 206. This list may include items that are currently being promoted by the gift instrument vendor 206, top-selling items, seasonal items, slow-selling items, high margin items, or other items that the gift instrument vendor 206 has determined would be appealing or appropriate. In an embodiment, the customization component 216 generates the suggested customization information as a function of one or more of the purchased gift instrument 210, the gift instrument vendor 206, and the gift instrument recipient 204. For example, the suggested customization information is generated as a function of one or more of the type, design, and value of the purchased gift instrument 210. Alternatively or in addition, the customization component 216 generates the suggested customization information as a function of one or more characteristics of the gift instrument purchaser 202 such as the age, gender, geographic region, past purchasing history, and past browsing history. The attributes or characteristics of the gift instrument recipient 204 may also affect the suggested customization information. For example, the gift instrument purchaser 202 provides the customization component 216 with data describing the gift instrument recipient 204 such as physical characteristics (e.g., height, weight, clothing size, shoe size) as well as likes and dislikes of the gift instrument recipient 204 (e.g., sports, politics, religion).

In some embodiments, the customization component 216 automatically selects a delivery option for the gift instrument 210 based on a delivery preference of the gift instrument recipient 204. For example, the gift instrument recipient 204 has a stored preference for receiving communications via electronic mail, postal mail, text messaging, or short message service (SMS) messaging. The gift instrument recipient 204 also specifies the communication format such as text or markup language, and a preferred device for receiving the communication such as a cellular telephone, a laptop, a personal digital assistant, or anther mobile computing device.

Responsive to the suggested customization information, the gift instrument purchaser 202 selects one or more of the suggested customizations or items recommendations and/or provides additional items to create the customization information 221 for association with the gift instrument 210. For example, the gift instrument purchaser 202 selects one or more products from a list created by the gift instrument recipient 204 (e.g., a "wish list" of the gift instrument recipient 204), products from a list created by the gift instrument purchaser 202 (e.g., a "wish list" of the gift instrument purchaser 202), products from a list of top-selling products, products associated with a theme (e.g., outdoor, adventure, travel, technology, gaming, books), products from a product recommendation service, products from a purchase history of the gift instrument purchaser 202, products from a category defined by the gift instrument purchaser 202, and query terms to identify one or more products dynamically.

In some embodiments, the customization information 221 includes one or more rules specified by the gift instrument purchaser 202 for association with the gift instrument 210. For example, in addition to potentially recommending specific items to the gift instrument recipient 204, the gift instrument purchaser 202 can restrict the redemption of the gift instrument 210 to a set of items, a category or a type of items. For example, in some embodiments, the gift instrument purchaser 202 restricts redemption of the gift to a category such as digital media purchases or rentals. The rules could also specify that the available media be constrained by a rating, such as a parental rating (e.g. G, PG, PG-13, R, etc.) or media that excludes explicit lyrics or language. In other examples, the gift instrument purchaser 202 directs that the gift instrument 210 can only be redeemed for books (e.g., not video games), books of a selected genre (e.g., romance, action, historical, etc.), books having a selected author, etc. The rule can also specify a type of delivery mechanism (e.g., physical shipment versus digital downloads) or delivery speed. It can be appreciated that a wide variety of rules are possible and they will vary by, among other things, the type of item being gifted. A processor 224 is configured to access and apply the rules during redemption by the gift instrument recipient 204.

The customization information 221 is used to, among other potential benefits, create a customized and personalized redemption experience for the gift instrument recipient 204. The gift instrument purchaser 202 may also provide a message to be presented to the gift instrument recipient 204 during redemption. For example, the gift instrument purchaser 202 specifies that text such as "Happy Birthday from Mom," an image or video of balloons or a cake, or an audio clip such as a rendition of a birthday song or recording by the gift instrument purchaser 202 be rendered to the gift instrument recipient 204. The gift instrument purchaser 202 may also specify when the message should be displayed to the gift instrument recipient 204 (e.g., at login of the gift instrument recipient 204, while browsing the product catalog, at checkout, after checkout, at the time of delivery of the gift, or in the packaging associated with the gift instrument 210). In an embodiment, the gift instrument purchaser 202 includes a plurality of books in the redemption recommendation information 222 and includes a message with the customization information 221 conveying a message such as "I liked these books, but I'm not sure which one you'd like best. Please buy yourself one."

The gift instrument purchaser 202 specifies a particular theme or look and feel to the redemption experience in an online redemption example. In such an example, the gift instrument purchaser 202 selects or designs the layout, graphics, or any other presentation aspect of a product catalog web site. The selected or designed web site is stored as part of the customization information 221.

In some embodiments, the gift instrument purchaser 202 also specifies a particular shipping method. For example, the gift instrument purchaser 202 purchases discounted shipping or two-day shipping for all items redeemed by the gift instrument recipient 204 using the gift instrument 210. In further embodiments, the gift instrument purchaser 202 pre-selects a gift-wrap option for all items redeemed by the gift instrument recipient 204 using the gift instrument 210.

The memory component 218 can be accessed to associate the customization information 221 from the gift instrument purchaser 202 with the identification data 220 for the gift instrument 210. For example, the memory component 218 stores the customization information 221 including the redemption recommendation information 222 with the identification data 220 for the purchased gift instrument 210 in the memory area 208. The memory area 208 stores information for one or more of the gift instruments 210 such as gift instrument #1 through gift instrument #N, where N is a positive integer. The gift instruments 210 include physical gift instruments or electronic gift instruments. In some embodiments, the gift instruments 210 are grouped such that all the gift instruments 210 in the group have the same customization information 221. As such, the redemption experience for the gift instruments 210 in the group will be the same. Such embodiments are appropriate, for example, when the gift instrument purchaser 202 is a corporation and the gift instrument recipients 204 are employees of the corporation.

The gift instrument redemption service 212 includes the processor 224 configured to execute computer-executable instructions for interacting with the memory area 208 and the gift instrument recipient 204. In an embodiment, the processor 224 operates in conjunction with a redemption component 226 to redeem the gift instrument 210. The processor 224 is configured to receive, from one of the gift instrument recipients 204, a request to redeem at least one of the gift instruments 210. The received request includes the identification data 220 for the gift instrument 210. The processor 224 is further configured to access the memory area 208 responsive to the received request to determine the customization information 221 associated with the identification data 220 for the gift instrument 210. The processor 224 is further configured to provide to the gift instrument recipient 204 the customization information 221 associated with the identification data 220 for the gift instrument 210. For example, the redemption recommendation information 222 includes a list of items displayed to the gift instrument recipient 204 as text, images, audio, and/or video in a window as the gift instrument recipient 204 is browsing a product catalog. In embodiments in which the customization information 221 includes a message from the gift instrument purchaser 202, the message is provided to the gift instrument recipient 204 at the time specified by the gift instrument purchaser 202 (e.g., at login, checkout, etc.). In embodiments in which the gift instrument purchaser 202 has specified a customized web site (e.g., for browsing the product catalog), the customized web site is presented to the gift instrument recipient 204 after the gift instrument recipient 204 has been identified to the gift instrument redemption service 212. In some embodiments, the monetary value of the gift instrument 210 is not provided to the gift instrument recipient 204 until the gift instrument recipient 204 accesses the gift instrument redemption service 212. The gift instrument recipient 204 can then log in prior to redeeming the gift instrument 210 thus enabling the gift instrument redemption service 212 to apply the customization information 221 to the redemption experience.

The gift instrument recipient 204 selects one or more items (e.g., products or services from a product catalog) for redemption. In some embodiments, at least one of the selected items corresponds to an item from the redemption recommendation information 222. The gift instrument 210 is redeemed by the gift instrument redemption service 212 for the selected items.

Aspects of the invention provide the gift instrument recipient 204 with incentives to redeem the gift instrument 210 for one or more of the items from the redemption recommendation information 222. For example, the gift instrument recipient 204 is given a percentage discount if the item selected by the gift instrument recipient 204 appears in the redemption recommendation information 222.

In some embodiments, the gift instrument redemption service 212 identifies the selected items to the corresponding gift instrument purchaser 202. The selected items are identified as the items are selected, or only after all the items have been purchased. For example, the gift instrument purchaser 202 is notified whenever the gift instrument recipient 204 selects a particular item from the redemption recommendation information 222, views a description of the particular item, adds the particular item to an electronic shopping cart, or completes a purchase transaction for the particular item or for all the selected items. The gift instrument redemption service 212 identifies the corresponding gift instrument purchaser 202 based on the identification data 220 associated with the gift instrument 210 and provides a notification to the identified gift instrument purchaser 202. The notification includes, for example, a voice message, electronic message, or text message indicating that the gift instrument recipient 204 has selected the particular item. In some embodiments, the notification is a "thank you" note from the gift instrument recipient 204 listing the one or more items selected by the gift instrument recipient 204. In this manner, the gift instrument purchaser 202 is notified of the ultimate use of the gift instrument 210 previously presented to the gift instrument recipient 204.

In some embodiments, the memory area 208 maintains a redemption history for each of the gift instrument recipients 204. The redemption history identifies the items for which one or more of the gift instruments 210 were redeemed by each of the gift instrument recipients 204. The redemption history is used, for example, by the customization component 216 of the gift instrument vendor 206 to generate the suggested customization information. For example, when recommending a list of items, the customization component 216 will omit items known to have been purchased previously by the gift instrument recipient 204. In this manner, the recommended items are customized for each of the gift instrument recipients 204 to provide a rich redemption experience.

Alternatively or in addition, the redemption history includes a list of the gift instruments 210 that each of the gift instrument recipients 204 has received and identifies the gift instrument purchaser 202 associated with each of the gift instruments 210. In this manner, the gift instrument recipient 204 is able to determine which gift instruments 210 were received from which gift instrument purchasers 202.

Figure 3:
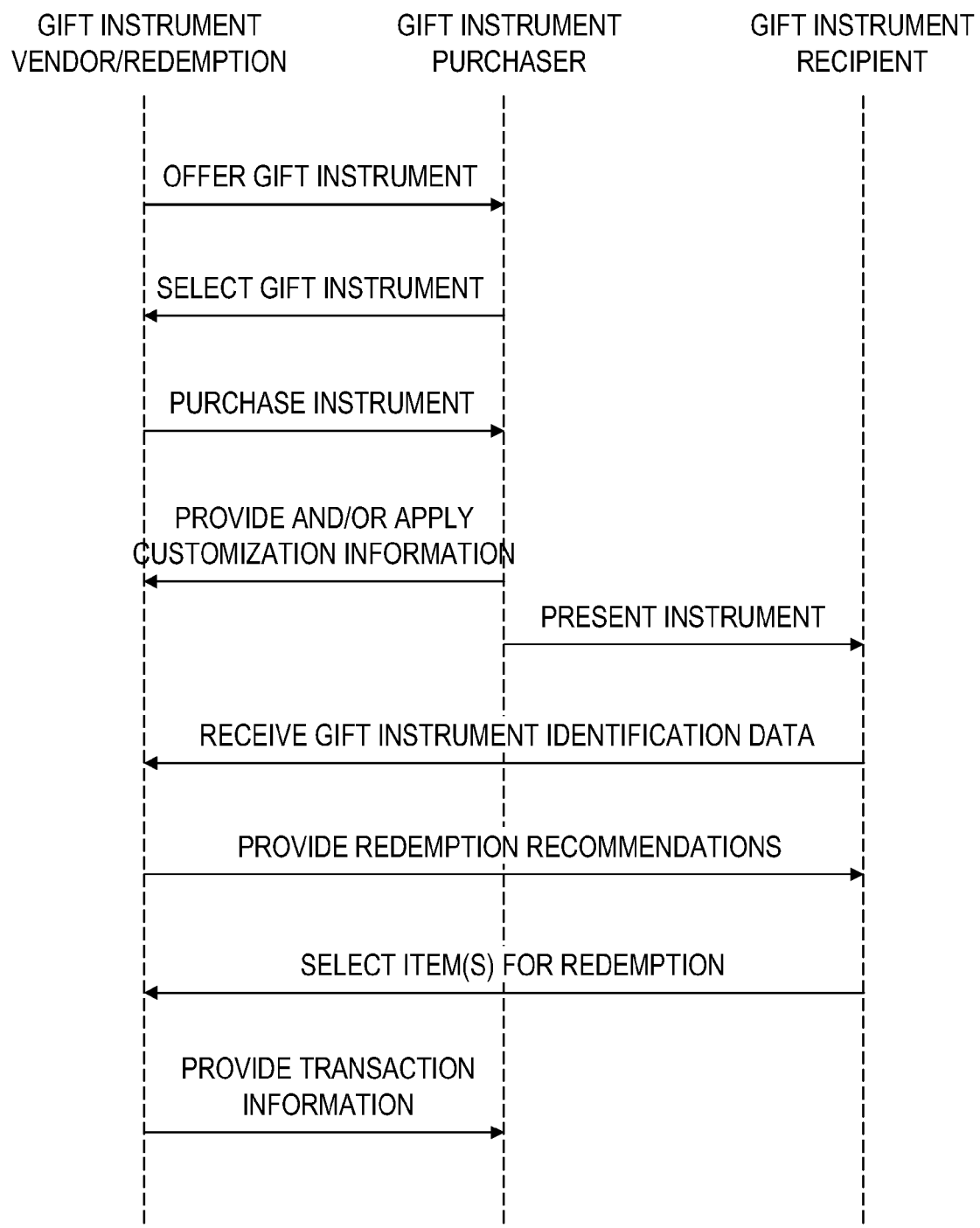
FIG. 3 is an example sequence diagram illustrating interactions between gift instrument sale and redemption, the gift instrument purchaser, and the gift instrument recipient.

Referring next to FIG. 3, an example sequence diagram illustrates interactions between gift instrument 210 sale and redemption, the gift instrument purchaser 202, and the gift instrument recipient 204. In the example of FIG. 3, the gift instrument vendor 206 and the gift instrument redemption service 212 are a single entity. The gift instrument purchaser 202 purchases the gift instrument 210 selected from a plurality of the gift instruments 210 offered by the gift instrument vendor 206. The gift instrument purchaser 202 customizes the gift instrument 210 and provides the redemption recommendation information 222 to the gift instrument vendor 206, along with any other customization information 221. The gift instrument purchaser 202 presents the gift instrument 210 to the gift instrument recipient 204.

At redemption, the gift instrument recipient 204 provides the identification data 220 for the gift instrument 210 to the gift instrument vendor 206. The gift instrument vendor 206 determines and provides the redemption recommendation information 222 to the gift instrument recipient 204, along with any other customization information 221 associated with the gift instrument 210. The gift instrument recipient 204 selects items for redemption and completes the redemption process. The gift instrument vendor 206 notifies the gift instrument purchaser 202 of the redemption and identifies the items for which the gift instrument 210 was redeemed.

Figure 4:
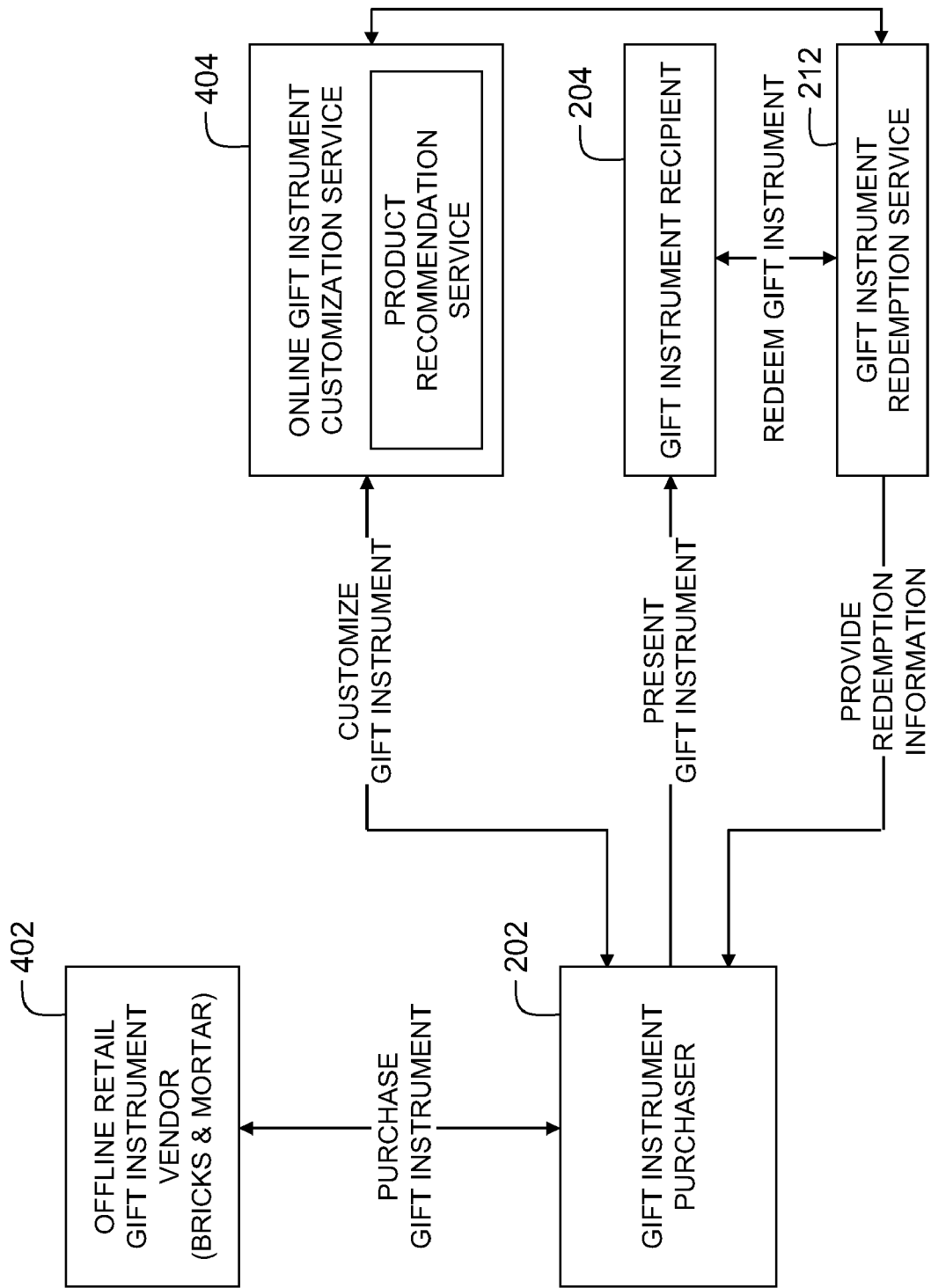
FIG. 4 is an example block diagram illustrating the online customization of a gift instrument purchased offline at a retail store.

Referring next to FIG. 4, an example block diagram illustrates the online customization of the gift instrument purchased offline at a point of sale of a bricks-and-mortar retail gift instrument vendor 402. The gift instrument purchaser 202 purchases the gift instrument 210 from the offline retail gift instrument vendor 402 (e.g., a physical store). The gift instrument purchaser 202 then interacts with the online gift instrument customization service 404 to customize the purchased gift instrument 210. For example, the gift instrument purchaser 202 provides the customization information 221 along with a serial number or other form of the identification data 220 to the online gift instrument customization service 404. In an embodiment, the online gift instrument customization service 404 includes a product recommendation service. The online gift instrument customization service 404 associates the customization information 221 with the identification data 220.

The gift instrument purchaser 202 presents the gift instrument 210 to the gift instrument recipient 204. The presentation includes, for example, a transfer of a physical gift instrument or an electronic mail message conveying the identification data 220 of the gift instrument 210 to the gift instrument recipient 204. The gift instrument recipient 204 redeems the gift instrument 210 with the gift instrument redemption service 212. For example, the gift instrument recipient 204 sends a request for redemption of the gift instrument 210 and identifies the gift instrument 210 via the identification data 220. The gift instrument redemption service 212 communicates with the online gift instrument customization service 404 to access the customization information 221 associated with the gift instrument 210. The gift instrument redemption service 212 applies the customization information 221 during redemption of the gift instrument 210. Upon completion of the redemption, the gift instrument redemption service 212 provides redemption information or other transaction information to the gift instrument purchaser 202. For example, the gift instrument redemption service 212 identifies the items for which the gift instrument 210 was redeemed.

One technical effect is to customize the gift instrument 210 by combining knowledge of the gift instrument purchaser 202 with knowledge of the gift instrument recipient 204. Other technical effects include logic to provide items recommended by the gift instrument purchaser 202, logic to provide the customization information 221 associated with the gift instrument 210 to personal the redemption experience, and logic to provide a customized message between the gift instrument purchaser 202 and the gift instrument recipient 204.

Referring next to FIG. 5, a sequence diagram illustrates the customized presentation of the gift instrument 210 to the gift instrument recipient 204. The gift instrument purchaser 202 purchases the gift instrument 210 selected from a plurality of the gift instruments 210 offered by the gift instrument vendor 206. The gift instrument vendor 206 receives, determines, accesses, generates, or otherwise obtains the customization information 221 for the gift instrument 210. The customization information 221 may be based on data from one or more of a plurality of sources. For example, the customization information 221 is based on data relating to the gift instrument purchaser 202, the gift instrument recipient 204 (e.g., a personalized recommended product list, the purchase history of the user, user preferences, etc.), and/or data from the gift instrument vendor 206 (e.g., a top seller list, promotional items, seasonal items, etc).

The gift instrument vendor 206 provides the customized gift instrument 210 to the gift instrument purchaser 202. The gift instrument purchaser 202 then presents the customized gift instrument 210 to the gift instrument recipient 204. Optionally, the gift instrument vendor 206 presents the customized gift instrument 210 directly to the gift instrument recipient 204. For example, the gift instrument vendor 206 sends an electronic mail message to the gift instrument recipient 204 with the customization information 221 and a gift code corresponding to the gift instrument 210.

Referring next to FIG. 6, an example portion of a graphical user interface (GUI) illustrates customization of the gift instrument 210. The GUI displays the gift instrument 210 along with options for customizing the redemption experience for the gift instrument recipient 204. For example, the gift instrument purchaser 202 selects a list of products to recommend to the gift instrument recipient 204, specifies a message to be presented to the gift instrument recipient 204, and specifies whether or not to display item recommendations at the delivery and/or redemption of the instrument.

Figure 7:
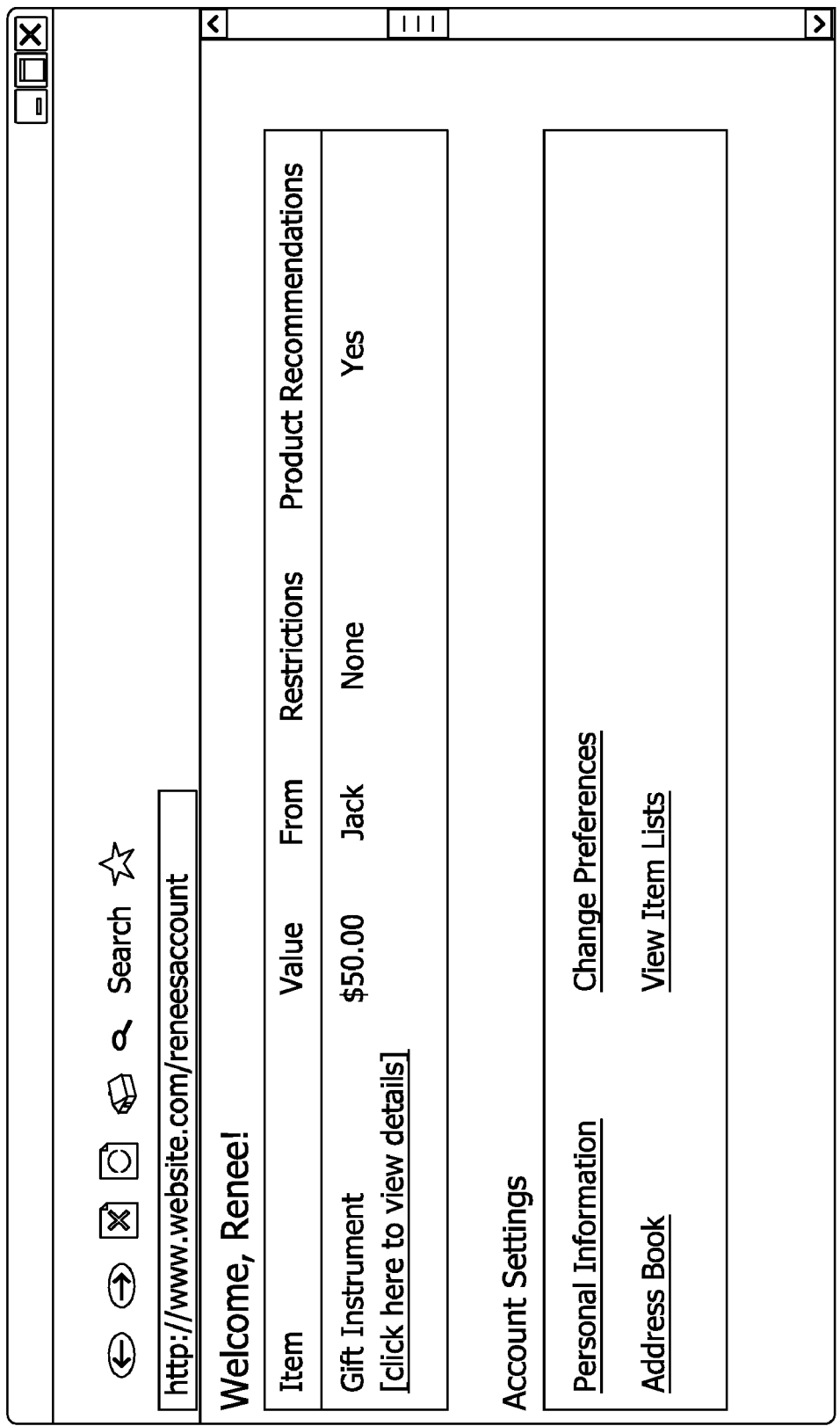
FIG. 7 is an example portion of a graphical user interface illustrating a gift instrument available to a recipient for redemption.

Referring next to FIG. 7, an example portion of a GUI illustrates the gift instrument 210 available for redemption. Upon login, the gift instrument recipient 204 is able to view a list of available gift instruments 210. In the example of FIG. 7, a single gift instrument is available for redemption. Some of the customization information 221 may be presented to the gift instrument recipient 204 in this view. Upon selecting the displayed gift instrument (e.g., clicking a link), the gift instrument recipient 204 is presented with a redemption page customized by the gift card purchaser 202 (see FIG. 8 below).

Figure 8:
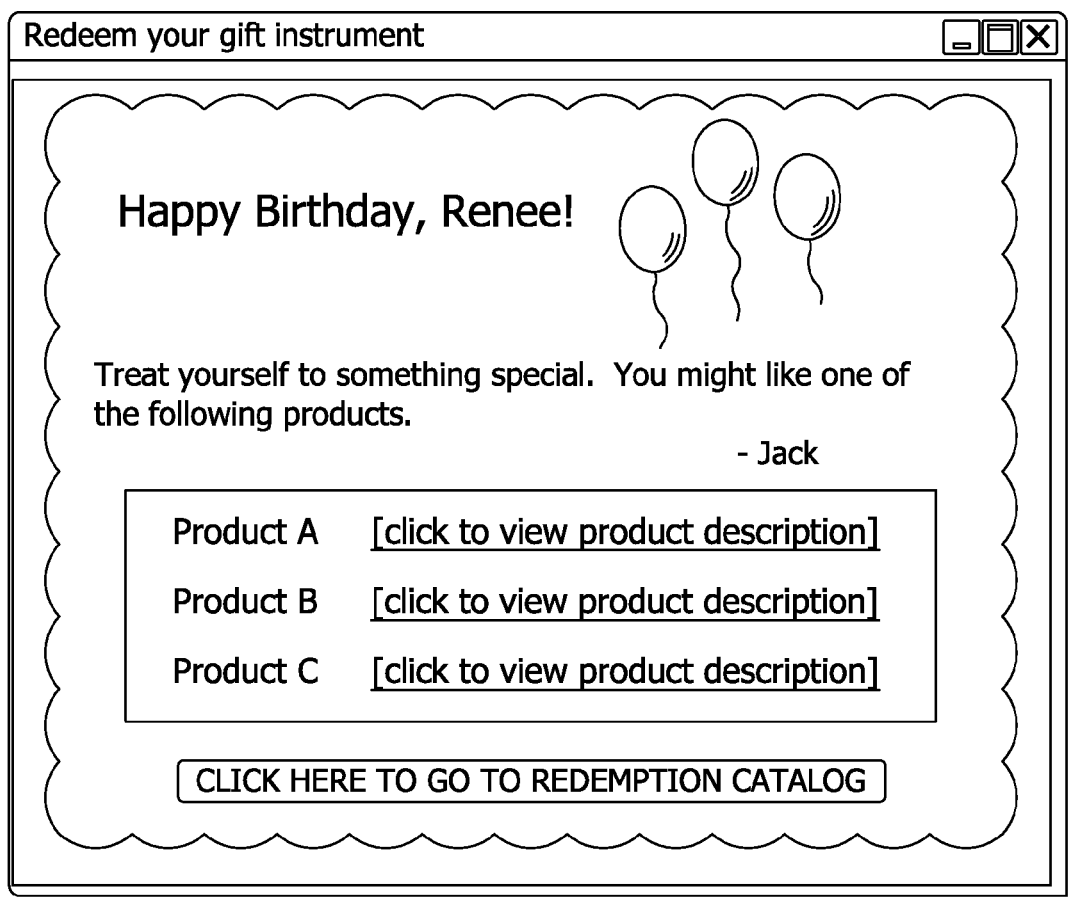
FIG. 8 is an example portion of a graphical user interface illustrating the customized redemption of a gift instrument by a recipient.

Referring next to FIG. 8, an example portion of a GUI illustrates the customized redemption of the gift instrument 210 by the gift instrument recipient 204. In the example of FIG. 8, a redemption page has been customized with the customization information 221 for gift instrument recipient 204. For example, a message from the gift instrument purchaser 202 is displayed along with product recommendations selected in accordance with instructions from the gift instrument purchaser 202. The gift instrument recipient 204 is able to view details about any of the recommended products, and has the option to redeem the gift instrument 210 for the recommended products or any other product or item from a redemption catalog.

Exemplary Operating Environment

A computing device or computer such as described herein has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The computer may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. In operation, a computer executes computer-executable instructions embodied in one or more computer-executable components stored on one or more computer-readable media to implement aspects of the invention described and/or illustrated herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for customizing, by the gift instrument purchaser 202, the gift instruments 210 for the gift instrument recipients 204.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method comprising:
offering, by a computing device, a plurality of gift instruments for purchase by a gift instrument purchaser for a gift instrument recipient;
receiving, by the computing device, from the gift instrument purchaser, a selection of at least one of the offered plurality of gift instruments, said selected gift instrument having identification data associated therewith;
receiving, by the computing device, from the gift instrument purchaser, customization information for association with the gift instrument, said customization information comprising redemption recommendation information comprising query terms, wherein the query terms describe one or more of the following: a category, a type, a feature, and a characteristic of a product or service;
associating, by the computing device, the received customization information with the identification data for the gift instrument in a memory area;
receiving, by the computing device, from the gift instrument recipient, a request to redeem the gift instrument, said request including the identification data;
upon receiving the request to redeem the gift instrument, dynamically generating, by the computing device, a list of one or more products or services based on the query terms and a value of the gift instrument by performing a search on a catalog using the query terms; and providing, by the computing device, the dynamically generated list of the one or more products or services to the gift instrument recipient.

2. The method of claim 1, further comprising:

redeeming the gift instrument for the gift instrument recipient for one or more items; and providing transaction information to the gift instrument purchaser, said transaction information describing said redeeming.

3. A system comprising:

a memory area having stored therein identification data associated with a plurality of gift instruments purchased by a plurality of gift instrument purchasers for one or more gift instrument recipients, said memory area further storing customization information associated with each of the gift instruments, said customization information comprising redemption recommendation information comprising query terms specified by the gift instrument purchasers, wherein the query terms describe one or more of the following: a category, a type, a feature, and a characteristic of a product or service; and a processor configured to execute computer-executable instructions for:

receiving, from one of the gift instrument recipients, a request to redeem at least one of the gift instruments, said received request including the identification data for said at least one of the gift instruments;

accessing the memory area responsive to the received request to determine the customization information associated with the identification data for said at least one of the gift instruments;

upon receiving the request to redeem the gift instrument, dynamically generating a list of one or more products or services based on the query terms and a value of said at least one of the gift instruments by performing a search on a catalog using the query terms; and providing, to said one of the gift instrument recipients, the generated list of the one or more products or services.

4. The system of claim 3, wherein the gifts cards are purchased from a physical merchant or an online merchant.

5. The system of claim 3, wherein the processor is further configured to execute computer-executable instructions for:

receiving a product selection from said one of the gift instrument recipients;

identifying one of the gift instrument purchasers based on the identification data for said one of the gift instruments; and providing a notification to the identified one of the gift instrument purchasers, said notification including transaction information relating to the received product selection.

6. The system of claim 5, wherein the memory area maintains a redemption history of said one of the gift instrument recipients by storing the received product selection.

7. The system of claim 5, wherein the processor is further configured to redeem the said one of the gift instruments for the received product selection.

8. The system of claim 3, wherein the identification data comprises a serial number.

9. The system of claim 3, wherein the processor is further configured to execute computer-executable instructions for customizing said at least one of the gift instruments by the gift instrument purchaser.

10. One or more non-transitory computer-readable media having computer-executable instructions stored therein, said instructions executable on a computing device to cause the computing device to perform operations comprising:

offering a plurality of gift instruments for purchase by a gift instrument purchaser for a gift instrument recipient;

receiving, from the gift instrument purchaser, a selection of at least one of the offered plurality of gift instruments, the selected gift instrument having identification data associated therewith;

receiving, from the gift instrument purchaser, customization information for association with the gift instrument, said customization information comprising redemption recommendation information comprising query terms, wherein the query terms describe one or more of the following: a category, a type, a feature, and a characteristic of a product or service;

associating the received customization information with the identification data for the gift instrument in a memory area;

receiving, from the gift instrument recipient, a request to redeem the gift instrument, the request including the identification data;

upon receiving the request to redeem the gift instrument, dynamically generating a list of one or more products or services based on the query terms and a value of the gift instrument by performing a search on a catalog using the query terms; and providing the dynamically generated list of the one or more products or services to the gift instrument recipient.

11. The non-transitory computer-readable media of claim 10, further comprising providing suggested recommendations for the customization.

\* \* \* \* \*